US006217057B1

(12) United States Patent
Kitchen et al.

(10) Patent No.: US 6,217,057 B1
(45) **Date of Patent: *Apr. 17, 2001**

(54) ADJUSTABLE MOBILE ORTHOSIS SEAT APPLIANCE

(75) Inventors: Carol Kitchen; Melody Ann Perrin, both of Clinton, MI (US)

(73) Assignee: Macomb Intermediate School District, Clinton Township, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,943

(22) Filed: Oct. 2, 1997

(51) Int. Cl.$^{7}$ .................................................... B62B 1/00

(52) U.S. Cl. .................... 280/650; 280/79.2; 280/47.38; 280/47.4

(58) Field of Search ................................ 280/304.1, 650, 280/647, 642, 250.1, 639, 655.1, 87.01, 47.34, 47.31, 47.38, 47.4, 79.2; 297/DIG. 4

(56) References Cited

U.S. PATENT DOCUMENTS 2,369,040 * 2/1945 Grady ................................ 280/250.1
3,170,709 * 2/1965 Shackel ............................. 280/47.34
3,788,695 1/1974 Salem ....................................... 297/6
4,010,499 * 3/1977 Davis et al. ...................... 280/47.38
4,266,305 5/1981 Kavaloski et al. ....................... 4/480
4,428,615 1/1984 Hynson ............................... 297/118
4,556,762 * 12/1985 Campbell ............................ 179/157
4,647,066 3/1987 Walton ................................ 280/657
5,112,076 5/1992 Wilson ................................ 280/657
5,255,934 10/1993 Wilson ................................ 280/657
5,358,263 * 10/1994 Aldus et al. ......................... 280/647
5,388,289 * 2/1995 Casperson ......................... 280/304.1
5,426,801 6/1995 Klearman et al. ....................... 5/652
5,445,433 8/1995 Avihod ................................ 297/380
5,489,258 * 2/1996 Wohnsen et al. ................. 280/250.1
5,551,756 9/1996 Gurasich et al. ................. 297/440.2

* cited by examiner

*Primary Examiner*—J. J. Swann
*Assistant Examiner*—James S. McClellan
(74) *Attorney, Agent, or Firm*—Raphael A. Monsanto; Benita J. Rohm

(57) ABSTRACT

A therapeutic support appliance for a patient disposed in a seating orthosis is provided with a base portion with casters coupled to its underside. A plurality of stanchions extend upwardly from the base member for engaging an adjustable handle and an adjustable orthosis support member, respectively. The handle can be adjusted to a height determined in response to a physical size characteristic of an operator or a therapist, and the orthosis support can be raised, lowered, or tipped in response to a physical size characteristic of the patient, the height of a table, or the administration of physical therapy. In one embodiment the appliance is formed of a vinyl coated steel tubular elements joined to one another.

26 Claims, 2 Drawing Sheets

ADJUSTABLE MOBILE ORTHOSIS SEAT APPLIANCE

BACKGROUND OF THE INVENTION

1. Field of the Invention

This invention relates generally to therapeutic seating appliances for invalid or handicapped patients, and more particularly, to a seat appliance that accommodates an orthosis and a patient.

2. Description of the Related Art

There is a need for a seat appliance that securely accommodates an orthosis, such as a GILLETTE seating orthosis, that conforms to the body of an individual patient, such as a child, to maintain body alignment and prevent deformities. The term "orthosis" as used herein includes, in addition to custom molded arrangements adapted to the specific physiology of a particular patient, other seating inserts for patients, such as students, that require more support than is provided by a conventional chair. The prior art provides various forms of walkers, table potty chairs, wheelchairs, and the like, which fall short of fulfilling certain needs of invalid or otherwise handicapped children. For example, it is desired that an invalid or handicapped child or student disposed on a seating appliance be positioned such that the student is brought closer to his or her peers. Such proximity provides significant psychological advantage to the student as it reduces the psychological impact of the ever-present hospital-like structures, including the seating appliance, the orthosis, etc. Known arrangements often include associated work tables for the students, because the structure of such known appliances often requires predetermined cut-outs in the table to accommodate the student and the seating appliance. Thus, in a conventional setting, the handicapped or invalid students are separated from one another and perform their classroom work on individual tables associated with their respective seat appliances. Such isolation limits interaction between the students, and since conventional seating appliances are bulky, the students cannot avoid the constant reminder of the hospital-like environment.

There is additionally a need for a mobile orthosis seat arrangement wherein a broader range of physical therapies can be administered to the patients than can be administered in a conventional handicapped seating arrangement. Such a seat should provide easy access for therapists to facilitate desired movements or hand-over-hand patterning for the patient. Such enhanced ergonomics would reduce the possibility of injury to the patients. In addition, there is a need for a streamlined orthosis seat appliance wherein a student can be brought, at an appropriate height, to a table work surface, such as a classroom table, with or without a cut-out. In addition, the improved seating appliance should facilitate the spatial orientation of the orthosis with the patient thereon to facilitate the administration of therapies to improve muscle tone and head and neck control.

It is, therefore, an object of this invention to provide a mobile orthosis seat arrangement for a patient suffering from a motor impairment, the mobile orthosis seat arrangement accommodating a seating orthosis in which the patient is seated.

It is another object of this invention to provide an adjustable mobile orthosis seat arrangement for a patient that is seated in a seating orthosis, wherein the patient can be brought to a table at a predetermined correct patient-to-table relationship.

It is also an object of this invention to provide a compact mobile orthosis seat arrangement whereby the number of orthosis seats that can be arranged about a table is increased over known arrangements.

It is a further object of this invention to provide a mobile orthosis seat arrangement for a child in a seating orthosis, wherein motion of the arms of the child is not restricted.

It is additionally an object of this invention to provide an orthosis seat arrangement wherein therapies for improving muscle tone and head and neck control of the patient are easily administered.

It is yet a further object of this invention to provide a simple and economical orthosis seat arrangement that easily can be adjusted in response to a physical size characteristic of the patient.

It is also another object of this invention to provide a simple and economical orthosis seat arrangement that easily can be adjusted in response to a physical size characteristic of an operator or therapist of the patient.

It is yet an additional object of this invention to provide a simple and economical orthosis seat arrangement that easily can be adjusted to place the patient in a predetermined spatial orientation, such as tipped from front to back or from side to side, to facilitate the administration of physical therapy.

SUMMARY OF THE INVENTION

The foregoing and other objects are achieved by this invention which provides, in a first aspect thereof, a therapeutic support arrangement for a patient, the therapeutic support arrangement being mobile on a substantially horizontal surface in response to a directional force applied by an operator or therapist. In accordance with the invention, the therapeutic support arrangement is provided with a base member having an underside, a rear side, and a pair of distal lateral sides. A plurality of casters extend downward from the underside of the base member for facilitating multidirectional displacement of the base member along the substantially horizontal surface. A pair of handle support stanchions is coupled to, and arranged to extend upward from, the base member. A handle arrangement is coupled to the pair of handle support stanchions for receiving the directional force applied by the operator. There is additionally provided an orthosis support member for supporting an orthosis device for the patient. A pair of orthosis support member stanchions is coupled to, and arranged to extend upward from, the base member for supporting the orthosis support member. The orthosis support member is slidably engaged with, and fixable to, the pair of orthosis support member stanchions, whereby the height of the orthosis support member, with respect to the base member, is adjustable.

In one embodiment of the invention, the handle arrangement is slidably coupled to the pair of handle support stanchions. Additionally, there is provided a handle lock arrangement for facilitating a height adjustment of a handle arrangement with respect to the pair of handle support stanchions. Thus, operators or therapists of different heights can operate the therapeutic support arrangement of the present invention comfortably.

Further in accordance with the invention, the orthosis support member is slidably coupled to the pair of orthosis support member stanchions for facilitating a height adjustment of the orthosis support member with respect to the pair of orthosis support member stanchions. In a preferred embodiment, there is additionally provided a third orthosis support member stanchion arrangement substantially intermediate of the handle support stanchions extending upward from the rear of the base member. The orthosis support member is slidably engaged with the third orthosis support stanchion, whereby respective sections of the orthosis support member are fixable at different heights from one another. This permits the orthosis support member to be positioned in a tipped spatial orientation that facilitates the administration of therapy to the patient. Therapies can therefore easily be administered to the patient for improving muscle tone and improving head and neck control.

In a further embodiment of the invention, the base member has a substantially rectangular configuration. There are therefore provided four casters arranged at respective corners of the base member. Each such caster is adapted to be steerable to improve the maneuverability of the therapeutic support arrangement in response to the directional force applied by the operator or therapist. In a preferred embodiment, each such caster has an associated braking arrangement for fixing the therapeutic support arrangement at a desired position on the horizontal surface.

In a highly advantageous embodiment of the invention, the base member, the orthosis support member, and other portions of the therapeutic support arrangement are formed of vinyl coated steel tubing sections, in the form of tubular elements that are joined to one another. Such steel sections are commercially available under the trademark CREFORM, available from Creform Tech, Southfield, Mich. These structural elements are in the form of preformed piping that is lightweight, sturdy, and available with ready-made joints and connectors.

In use, the present invention has disposed thereon a seating orthosis installed in the orthosis support member. One such seating orthosis is available commercially under the trade name GILLETTE, and resembles a custom body armor for the patient. The seating orthosis is further provided with a patient footrest portion coupled thereto, and in some embodiments, a headrest.

In accordance with a further aspect of the invention, a therapeutic support appliance for a patient disposed in a seating orthosis is mobile on a support surface in response to a directional force applied by an operator, as previously discussed. In accordance with the invention, there is provided a base member having an underside, a rear side, and a pair of distal lateral sides. A roller arrangement is coupled to the base member for facilitating multidirectional displacement of the base member along the support surface in response to the force applied by the operator. A handle arrangement receives the force applied by the operator and is coupled to, and arranged to be upwardly adjustable in height with respect to, the base member. Additionally, an orthosis support member supports the seating orthosis appliance. The orthosis support member is coupled to, and arranged to be upwardly adjustable in height and in tipped relation with respect to, the base member.

In one embodiment of this further aspect of the invention, there are further provided a handle support stanchion coupled to and arranged to extend upward from the base member, and a handle coupling arrangement for slidably engaging the handle support stanchion and the handle to one another. Thus, operators or therapists of various heights can comfortably be accommodated by the appliance of the present invention.

As previously noted, there is additionally provided an orthosis support stanchion coupled to and arranged to extend upward from the base member. Additionally, there is provided an orthosis support coupling arrangement for slidably engaging the orthosis support stanchion and the orthosis support member to one another.

In a highly advantageous embodiment of the invention, the base member and the orthosis support member are formed of vinyl coated steel tubing sections in the form of tubular elements joined to one another.

In accordance with a still further aspect of the invention, there is provided a therapeutic support system for a patient disposed in a seating orthosis appliance. The therapeutic support system is mobile on a support surface, in response to a directional force applied by an operator or therapist. In accordance with the invention, the therapeutic support arrangement is provided with a base member having an underside, a rear side, and a pair of distal lateral sides. The base member is provided with an arrangement for communicating with the support surface and facilitating multidirectional displacement of the base member there along in response to the force applied by the operator. A handle receives the force applied by the operator, the handle being coupled to and arranged to be upwardly adjustable in height with respect to the base member. The handle is fixable at a handle height that is responsive to the physical size characteristic of the operator. Similarly, an orthosis support arrangement for supporting the seating orthosis appliance is provided and has an arrangement that is coupled to and arranged to be upwardly adjustable in height with respect to the base member. Thus, the orthosis support arrangement is fixable at an predetermined orthosis height by the operator or therapist in response to a physical size characteristic of the patient. The height adjustability of the orthosis support arrangement is independent from that of the handle.

In one embodiment of this further aspect of the invention, the base member and the orthosis support member are formed of vinyl coated steel tubing sections in the form of tubular elements joined to one another, illustratively of the type available under the trademark CREFORM.

In a further embodiment of this further aspect of the invention, there is provided a table arrangement having a predetermined table height. The predetermined orthosis height is determined by the operator or therapist in response to the predetermined table height.

BRIEF DESCRIPTION OF THE DRAWING

Comprehension of the invention is facilitated by reading the following detailed description, in conjunction with the annexed drawing, in which.

DETAILED DESCRIPTION

Figure 1:
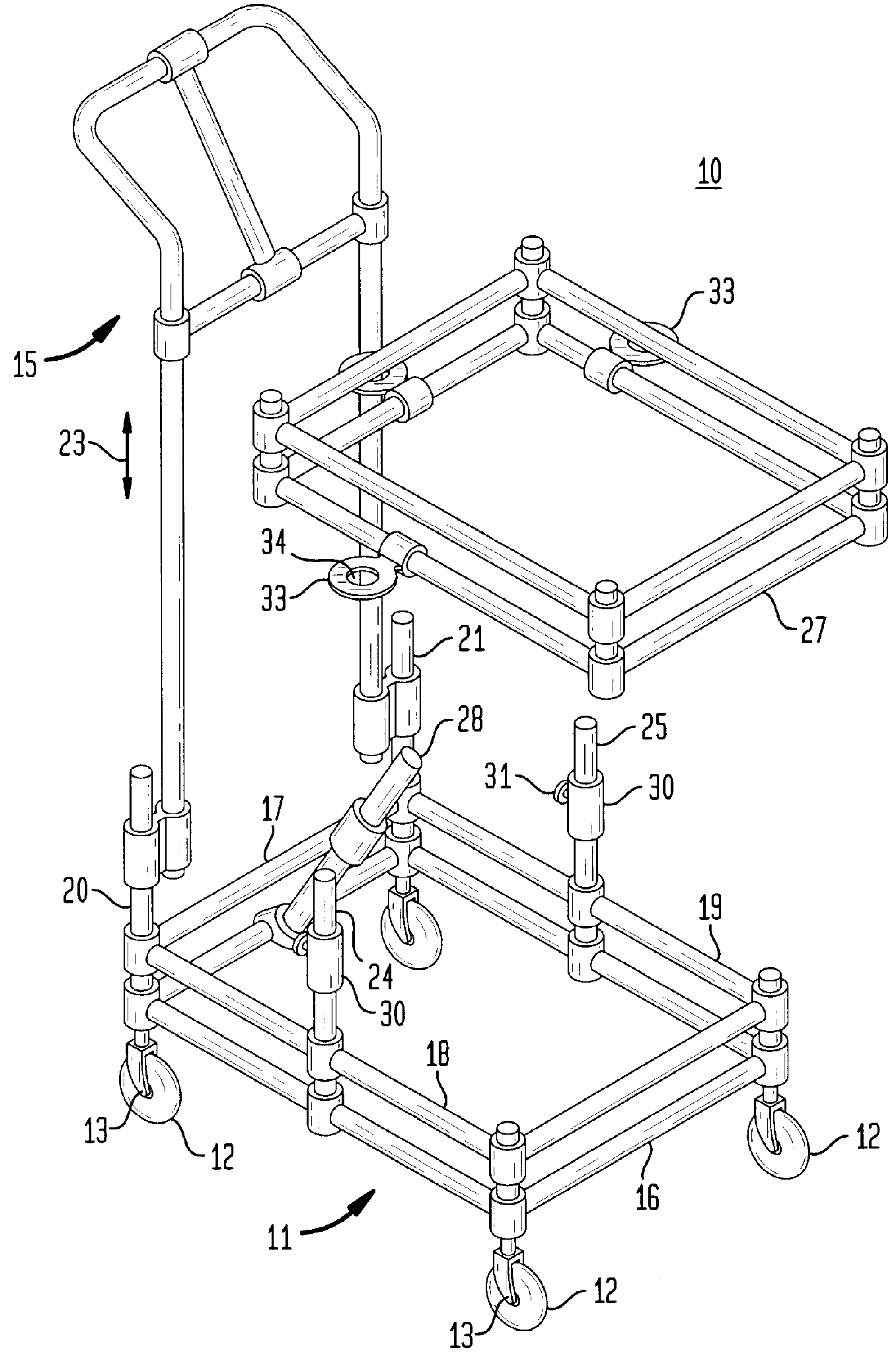
FIG. 1 is a simplified schematic isometric representation of a specific illustrative embodiment of the invention.

FIG. 1 is a simplified schematic representation of a specific illustrative embodiment of the invention shown in partially exploded isometric form. As shown, an adjustable mobile orthosis seat appliance 10 has a base member 11 with a plurality of casters 12 extending downward therefrom. As shown, each of casters 12 is provided with an associated caster brake 13 that permit secure placement of the adjustable mobile orthosis seat appliance at a desired location. Casters 12 rotate along a horizontal surface (not shown) and are steerable in response to a directional force applied by an operator (not shown) at a handle portion 15.

Base member 11 has a front 16, a rear portion 17 and respective sides 18 and 19. In this specific illustrative embodiment of the invention, a pair of handle stanchions 20 and 21 are arranged to extend upward from base member 11 and are coupled thereto at respective ends of rear rear portion 17. Handle portion 15 is slidably engaged with handle stanchions 20 and 21 whereby it is adjustable in height with respect to base member 11, in the direction of arrow 23.

Each of base member sides 18 and 19 is provided with an associated one of stanchions 24 and 25 for supporting an orthosis support member 27. In this embodiment, there is additionally provided a further stanchion 28 coupled to rear portion 17 of base member 11. Stanchions 24, 25, and 28 support the orthosis support member, as will be described hereinbelow. Each of the stanchions is provided with a stop 30 that is slidably engaged with its associated stanchion, and can be fixed at a predetermined location there along, upon actuation of a set bolt 31.

In this specific embodiment of the invention, base member 11 and orthosis support member 27 are formed of a plurality of tubular members that are joined to one another as shown. In a highly advantageous embodiment, the tubular sections are formed of CREFORM vinyl coated steel tubing available from Creform Tech of Southfield, Mich. Preferably, all of the stanchions, including handle stanchions 20 and 21, as well as handle portion 15, are formed of CREFORM tubing.

Orthosis support member 27 is formed of a base frame 35 which is arranged to underlie an orthosis support frame 36. Each such frame, in this embodiment, has four sides (not specifically designated), the frames being coupled to one another at respective comers thereof via coupler stanchions 37.

Orthosis support member 27, as previously indicated, is formed of tubing sections, and further is provided at its respective sides and rear portion of base frame 35 with stanchion engagement members 33. Each stanchion engagement member has an aperture 34 therethrough through which is accommodated a respective one of stanchions 24, 25, and 28. In this specific illustrative embodiment of the invention, the apertures in the stanchion engagement members are dimensioned smaller than the diameter of stops 30. Thus, the location along the respective stanchions where stops 30 are fixed determine the height of orthosis support member 27 above base member 11. Additionally stops 30 are not all necessrily arranged at the same height above the base member, whereby the orthosis support member, upon being installed on the stanchions, need not be oriented parallel to the base member.

Figure 2:
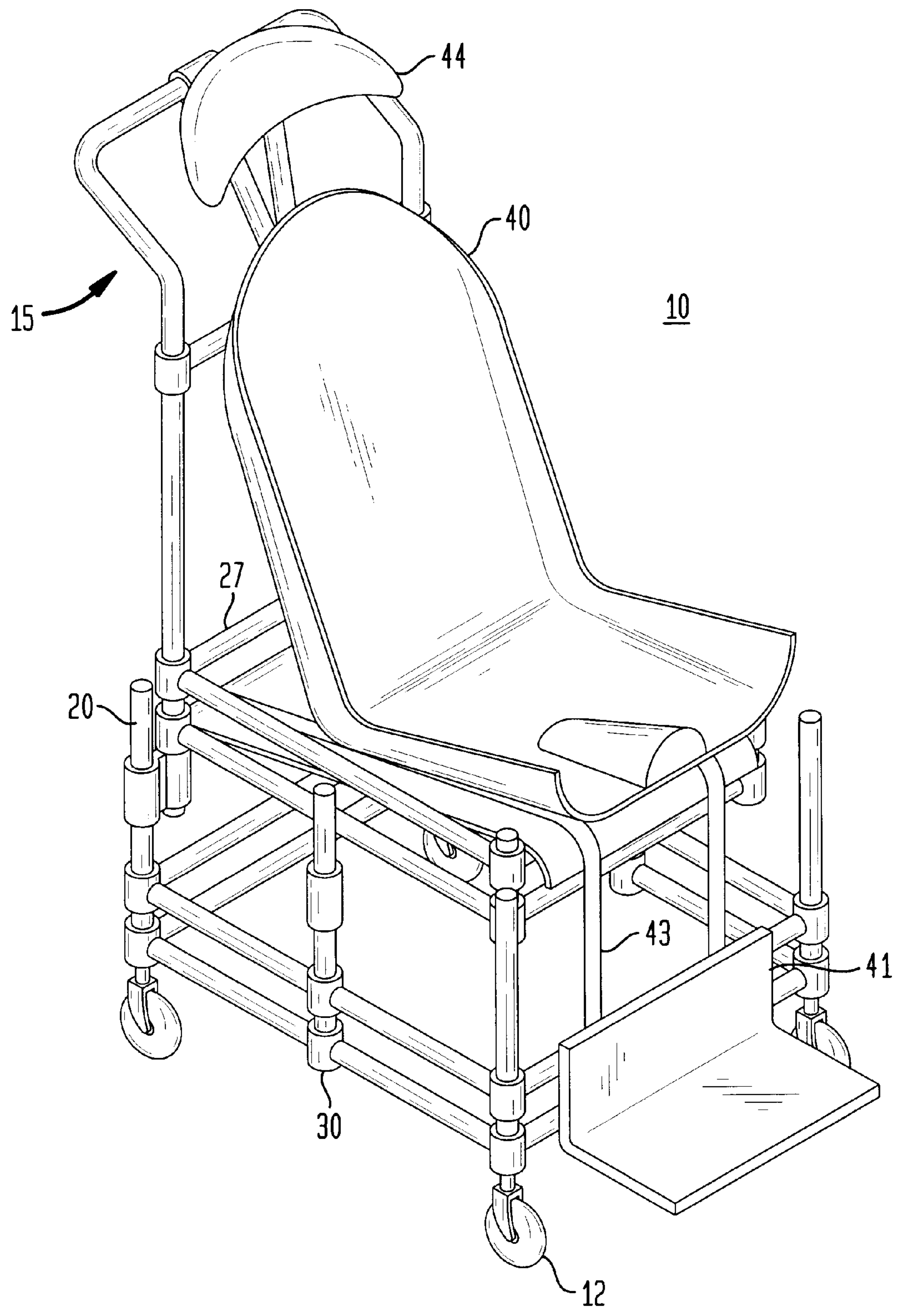
FIG. 2 is an isometric representation of the embodiment of FIG. 1 with an orthosis installed thereon.

FIG. 2 is an isometric representation of the adjustable mobile orthotic seat appliance 10 of FIG. 1 showing orthosis support member 27 installed thereon and an orthosis 40 mounted on the orthosis support member. In this specific embodiment, orthosis 40 is provided with a footrest portion 41 coupled to orthosis 40 by a pair of brackets 43. In addition, orthosis 40 has a headrest 44 coupled therewith.

In this embodiment, orthosis 40 is of the known GILLETTE seating orthosis type and comprises a custom support that has been contoured for a specific patient (not shown).

The height of orthosis 40, and its spatial orientation is determined in this embodiment by appropriate location of stops 30 along their respective stanchions. The height of handle portion 15 is adjustable independently from the height and orientation of orthosis support member 27. As S can be seen from the depiction of FIG. 2, the orthosis is installed on the adjustable mobile orthosis seating appliance without significant structure there around. Thus, the arms of the patient are readily available for performing school work at a work table (not shown) with other similarly seated patients, or for the administration of therapy. In addition, when the patient is brought to a classroom work table, very little of the structure of the appliance is visible, thereby providing psychological motivation for the patients to interact without the presence of hospital-like structures.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A therapeutic support arrangement for a patient, the therapeutic support arrangement being mobile on a substantially horizontal surface in response to a force applied by an operator, the therapeutic support arrangement comprising:

a base member having an underside, a rear side, and a pair of distal lateral sides;

a plurality of casters extending downward from the underside of said base member for facilitating multidirectional displacement of said base member along the substantially horizontal surface;

a pair of handle support stanchions coupled to and arranged to extend upward from said base member;

handle means coupled to said pair ofhandle support stanchions for receiving the force applied by the operator, an orthosis support arrangement for supporting an orthosis device for the patient, said orthosis support arrangement having, a first support frame for supporting the orthosis device for the patient, said first support frame having four sides configured in a substantially rectangular configuration, a second support frame coupled to and supporting said first support frame, said first support frame having four sides configured in a substantially rectangular configuration; and four support frame stanchions arranged at respective corners of said first and second support frames for supporting same in fixed. substantially parallel relation, said first support frame being disposed spatially superior to said second support frame;

first and second slidable support members coupled to said second support frame at respective laterally distal ones of the sides of said second support frame; and first and second orthosis support arrangement stanchions coupled to, and arranged to extend upward from, said base member for engaging slidably with respective ones of said first and second slidable support members, and supporting said orthosis support arrangement, said orthosis support arrangement being slidably engaged with, and fixable to, said first and second orthosis support arrangment stanchions, whereby the height and tilt of said orthosis support arrangement with respect to said base member is adjustable.

2. The therapeutic support arrangement of claim 1, wherein said handle means is slidably coupled to said pair of handle support stanchions, and there is further provided handle locking means for facilitating a height adjustment of said handle means with respect to said pair of handle support stanchions.

3. The therapeutic support arrangement of claim 1, wherein said orthosis support arrangment is slidably coupled to said first and second orthosis support arrangement stanchions for facilitating a height adjustment of said orthosis support arrangement with respect to said first and second orthosis support arrangement stanchions.

4. The therapeutic support arrangement of claim 3, wherein there is further provided a third orthosis support arrangement stanchion, said third orthosis support arrangement stanchion being arranged substantially intermediate of said handle support stanchions, said orthosis support arrangement being slidably engaged with said third orthosis support stanchion, whereby respective sections of said orthosis support arrangement are fixable at different heights from one another whereby said orthosis support arrangement is positioned in a tipped spatial orientation for facilitating the administration of therapy to the patient.

5. The therapeutic support arrangement of claim 1, wherein said base member has a substantially rectangular configuration, and said plurality of casters comprises four casters arranged substantially at respective corners of said base member, each of said casters having a respective plane of wheel rotation, the plane of wheel rotation being steerable.

6. The therapeutic support arrangement of claim 5, wherein there are further provided a plurality of braking arrangements, each associated with a respective one of said casters.

7. The therapeutic support arrangement of claim 1, wherein said base member is formed of vinyl coated steel tubing sections joined to one another.

8. The therapeutic support arrangement of claim 7, wherein said vinyl coated steel tubing sections of said base member comprise a respective plurality of tubular elements, said tubular elements being arranged horizontally to form respective sides of said base member.

9. The therapeutic support arrangement of claim 1, wherein said base member extends forward for a longer extent than said orthosis support arrangement.

10. The therapeutic support arrangement ofclaim 1, wherein said orthosis support arrangement is formed of vinyl coated steel tubing sections in the form of tubular elements joined to one another.

11. The therapeutic support arrangement of claim 1, wherein there is further provided a seating orthosis installed in said orthosis support arrangement.

12. The therapeutic support arrangement of claim 11, wherein said seating orthosis is further provided with a patient foot rest portion coupled thereto.

13. A therapeutic support appliance for a patient disposed in a seating orthosis appliance, the therapeutic support appliance being mobile on a support surface in response to a force applied by an operator, the therapeutic support arrangement comprising:

a base member having an underside, a rear side, and a pair of distal lateral sides;

roller means coupled to said base member for facilitating multidirectional displacement of said base member along the support surface in response to the force applied by the operator;

handle means for receiving the force applied by the operator, said handle means being coupled to and arranged to be upwardly adjustable in height with respect to said base member; and an orthosis support arrangement having an orthosis support frame for supporting the seating orthosis appliance and an orthosis base frame coupled by a plurality of coupling stanchions to the orthosis support frame, said orthosis base frame being coupled to and arranged to be upwardly adjustable in height and in tipped relation with respect to said base member.

14. The therapeutic support appliance of claim 13, wherein there are further provided:

a handle support stanchion coupled to and arranged to extend upward from said base member; and handle coupling means for slidably engaging said handle support stanchion and said handle one another.

15. The therapeutic support appliance of claim 13, wherein there are further provided:

an orthosis support stanchion coupled to and arranged to extend upward from said base member; and an orthosis support coupling element fixedly coupled to the orthosis base frame for slidably engaging said orthosis support stanchion and the orthosis base frame of said orthosis support arrangement to one another.

16. The therapeutic support appliance of claim 13, wherein said roller means comprises a plurality of casters extending downward from said base member for facilitating multidirectional displacement of said base member along the support surface.

17. The therapeutic support appliance of claim 16, wherein there is further provided a braking arrangement associated with at least one of said casters.

18. The therapeutic support appliance of claim 13, wherein said base member and said orthosis support arrangement are formed of vinyl coated steel tubing sections in the form of tubular elements joined to one another.

19. The therapeutic support appliance of claim 13, wherein there is further provided a seating orthosis installed in said orthosis support arrangement.

20. A therapeutic support system for a patient disposed in a seating orthosis appliance, the therapeutic support system being mobile on a support surface in response to a force applied by an operator, the therapeutic support arrangement comprising:

a base member having an underside, a rear side, and a pair of distal lateral sides;

a friction reducing arrangement coupled to said base member for communicating with the support surface and facilitating multidirectional displacement of said base member therealong in response to the force applied by the operator;

a handle for receiving the force applied by the operator, said handle being coupled to and arranged to be upwardly adjustable in height with respect to said base member and fixable at a handle height responsive to a physical size characteristic of the operator, an orthosis support frame for communicating with and supporting the seating orthosis appliance;

an orthosis base frame coupled to said orthosis support frame by a plurality of coupler stanchions and arranged to be upwardly adjustable in height with respect to said base member and fixable at a predetermined orthosis height by the operator in response to a physical size characteristic of the patient and independent of said handle height, said orthosis support frame being disposed spatially superior to said orthosis base frame.

21. The therapeutic support system of claim 20, wherein said base member and said orthosis support means are formed of vinyl coated steel tubing sections in the form of tubular elements joined to one another.

22. The therapeutic support system of claim 20, wherein there are further provided:

a handle support stanchion coupled to and arranged to extend upward from said base member; and handle coupling means for slidably engaging said handle support stanchion and said handle means to one another.

23. The therapeutic support system of claim 20, wherein there are further provided:

an orthosis support stanchion coupled to and arranged to extend upward from said base member; and orthosis support coupling means for slidably engaging said orthosis support stanchion and said orthosis support base to one another.

24. The therapeutic support system of claim 20, wherein said orthosis support frame has front and back sections that are fixable at different heights from one another with respect to said base member whereby said orthosis support means is positioned at a predetermined spatial orientation for facilitating the administration of therapy to the patient.

25. The therapeutic support system of claim 24, wherein there is further provided a seating orthosis installed in engagement with said orthosis support frame.

26. The therapeutic support system of claim 25, wherein the seating orthosis is further provided with a patient foot rest portion coupled thereto.

* * * * *